US008839452B1

(12) United States Patent
Joy et al.

(10) Patent No.: US 8,839,452 B1
(45) Date of Patent: Sep. 16, 2014

(54) ACCESS RIGHTS MECHANISM FOR CORPORATE RECORDS

(75) Inventors: David S. Joy, South Windsor, CT (US); Robert Arnish, Needham, MA (US)

(73) Assignee: Bank of America Corporation, Charlotte, NC (US)

( * ) Notice: Subject to any disclaimer, the term of this patent is extended or adjusted under 35 U.S.C. 154(b) by 1105 days.

(21) Appl. No.: 11/850,021

(22) Filed: Sep. 4, 2007

(51) Int. Cl.
*G06F 17/30* (2006.01)

(52) U.S. Cl.
USPC .......... 726/27; 726/1; 726/2; 726/26; 726/28; 705/50; 705/51; 705/2; 705/3; 707/781; 707/783; 707/784; 707/785; 707/786

(58) Field of Classification Search
USPC ................ 726/28, 26; 707/786, 784, 785
See application file for complete search history.

(56) References Cited

U.S. PATENT DOCUMENTS

| | | | |
|---|---|---|---|
| 6,883,036 B1 * | 4/2005 | Barrett .......................... 709/248 |
| 7,024,392 B2 * | 4/2006 | Stefik et al. ...................... 705/51 |
| 7,107,268 B1 * | 9/2006 | Zawadzki et al. ..................... 1/1 |
| 7,302,634 B2 * | 11/2007 | Lucovsky et al. ............. 715/200 |
| 2002/0178138 A1 * | 11/2002 | Ender et al. ........................ 707/1 |
| 2003/0097331 A1 * | 5/2003 | Cohen .............................. 705/39 |
| 2003/0120655 A1 * | 6/2003 | Ohwada et al. .................... 707/9 |
| 2004/0039594 A1 * | 2/2004 | Narasimhan et al. ............. 705/1 |
| 2004/0139075 A1 * | 7/2004 | Brodersen et al. ................ 707/6 |
| 2005/0036663 A1 * | 2/2005 | Caspi et al. ................... 382/124 |
| 2006/0179409 A1 * | 8/2006 | Kaisermayr .................. 715/736 |
| 2006/0190391 A1 * | 8/2006 | Cullen et al. .................... 705/37 |
| 2006/0277595 A1 * | 12/2006 | Kinser et al. ...................... 726/3 |
| 2008/0005779 A1 * | 1/2008 | Takenaka et al. ................. 726/1 |
| 2008/0155652 A1 * | 6/2008 | DeBie ............................... 726/2 |

* cited by examiner

*Primary Examiner* — Alexander Lagor
(74) *Attorney, Agent, or Firm* — Banner & Witcoff, Ltd.; Michael A. Springs

(57) ABSTRACT

A method of managing access rights to corporate records is described. Employee data with respect to a first organizational hierarchy is maintained in a database, and file records data with respect to a second organizational hierarchy is maintained in another database. A request from an employee is received for a file record. A determination is made as to whether the requesting employee matches an entry in the first organizational hierarchy. Another determination is made as to whether the requested file record matches a file record of file records that the requesting employee is authorized to access, and access to the requested file record is permitted or denied to the requesting employee based upon the determinations.

22 Claims, 8 Drawing Sheets

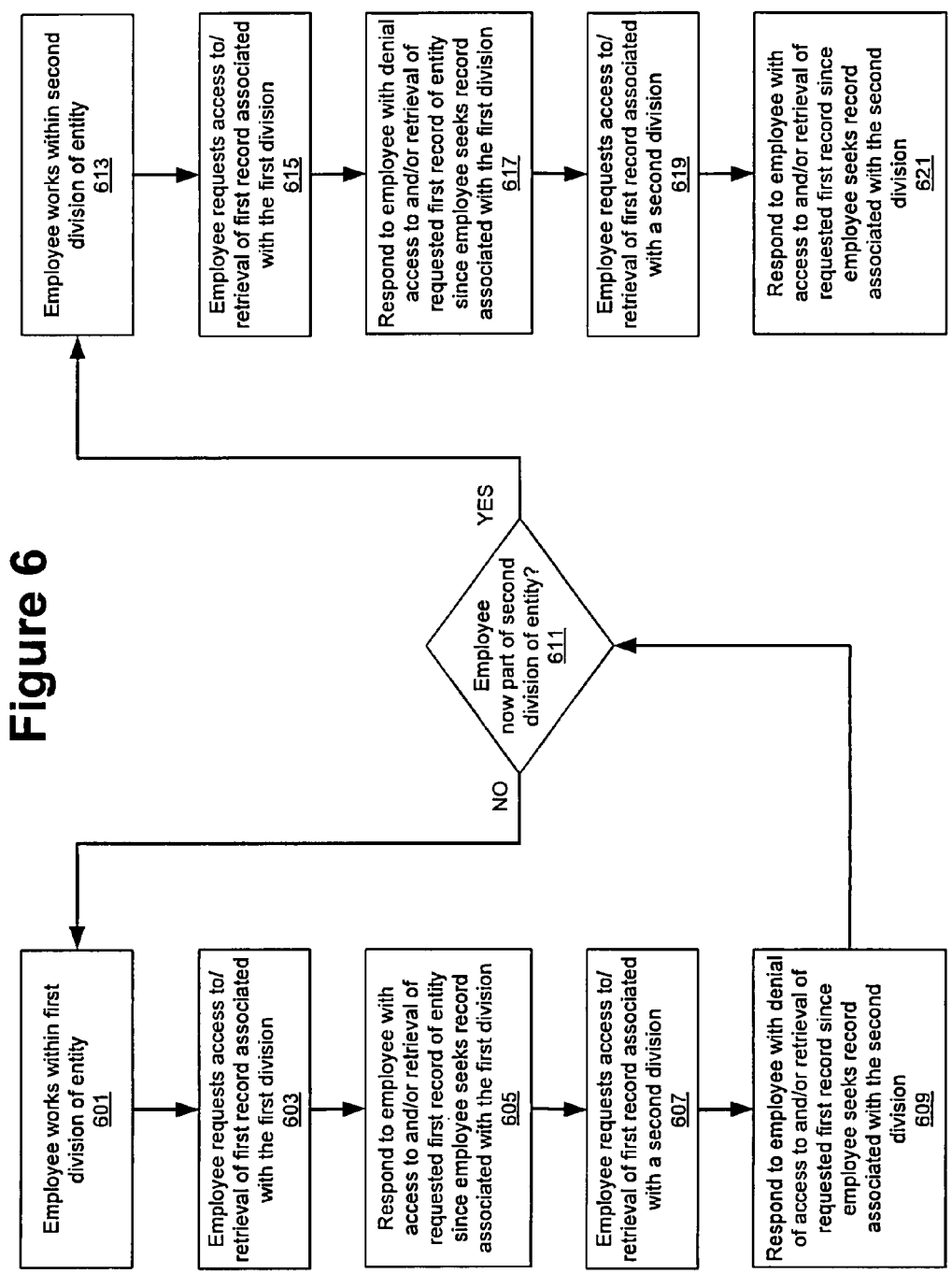

ACCESS RIGHTS MECHANISM FOR CORPORATE RECORDS

BACKGROUND

Many corporate information security standards require that an entity's employees have access only to records that pertain to their own business. Such corporate information security standards help reduce the chances of unauthorized distribution of materials and documents in addition to maintaining privacy concerns of customers and employees of the entity. Entities with large organizational structures may have many different departments with many different employees working within those departments. As such, an employee of the research and development department may have access rights to one set of documents while an employee in the financial department may have access rights to another set of documents.

In businesses with four to five employees, maintaining proper hard coded access rights to documents may be manageable. However, in the situation of a large entity, employees are constantly moving within the entity and the entity frequently changes its organizational structure. In such a situation, hard coded access rights architecture presents a maintenance challenge that is not practical.

Some entities employ an on-line ordering system provided by an outside supplier. However, such a system still fails to control access as required. A supper only can support providing access by a predetermined structure of predefined and fixed levels. These levels are hard-coded at time of account set-up and do not offer dynamic flexibility as employees move within the entity and/or as the hierarchy of the entity changes.

Therefore, there exists a need in the art for an automated system that tracks the hierarchical movement of an employee with a document access rights system.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present invention are directed to a method and system for managing corporate asset records. Employees of an entity may be provided an on-line ability to access and/or retrieve records in storage at a records supplier belonging to the employee's organizational division, and that employee's organizational division only. Aspects of the present invention also allow a view-all records feature for conducting research on any record, while limiting actual access to retrieval within the owning/permitted division only.

In accordance with other aspects of the present invention, employee access to corporate records is variable based on their current division within an organizational hierarchy and is updated automatically and periodically to reflect changes in their work assignment and hierarchy changes within an entity.

Aspects of the present invention allow for automated maintenance in an ordering system, tracking where an employee resides within a corporate organizational hierarchy, such as at the division level, and mapping that employee's access only to records in that same division. If an employee moves to a new division, she will no longer have access to the records in the previous division, but will have access only to the records in the new division. In addition, as an entity reorganizes, cartons stored in or owned by any given group as part of one division may be remapped to the group's new division.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein:

FIG. 6 is another example flow chart of an illustrative method for managing access rights to records of an entity in accordance with at least one aspect of the present invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
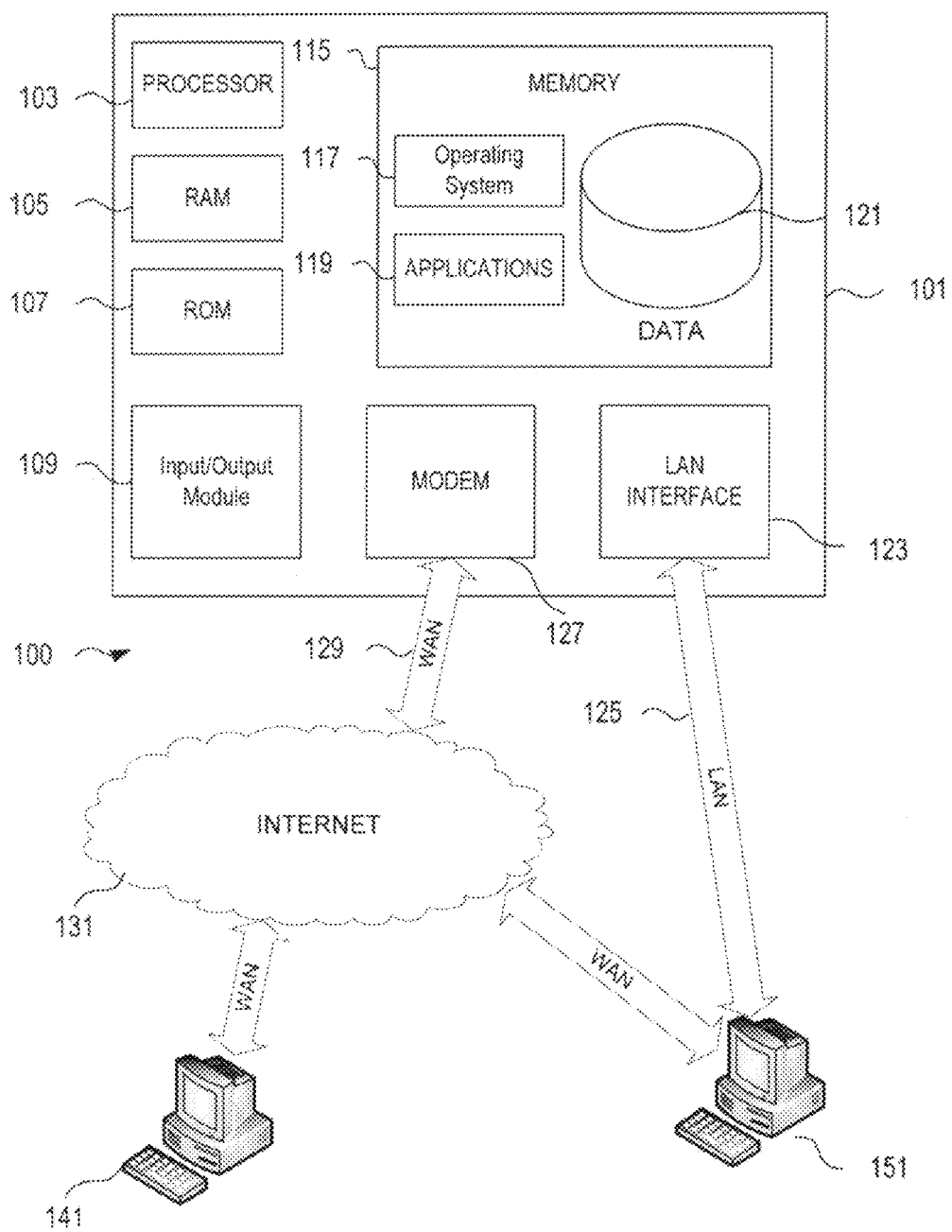
FIG. 1 illustrates a schematic diagram of a general-purpose digital computing environment in which certain aspects of the present invention may be implemented.

FIG. 1 illustrates a block diagram of a generic computing device 101 (e.g., a computer server) that may be used according to an illustrative embodiment of the invention. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 110 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and the like that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
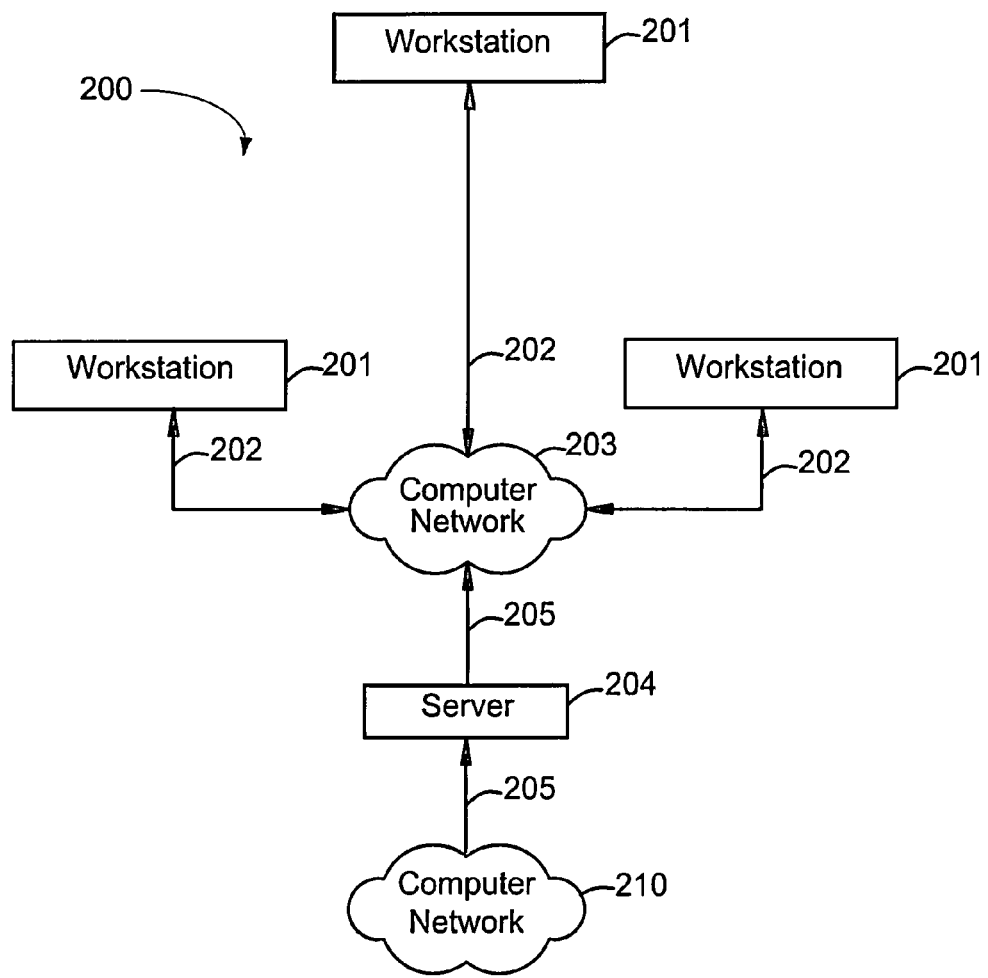
FIG. 2 is an illustrative block diagram of workstations and servers that may be used to implement the processes and functions of certain embodiments of the present invention.

Referring to FIG. 2, an illustrative system 200 for implementing methods according to the present invention is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links and the like.

Figure 3A:
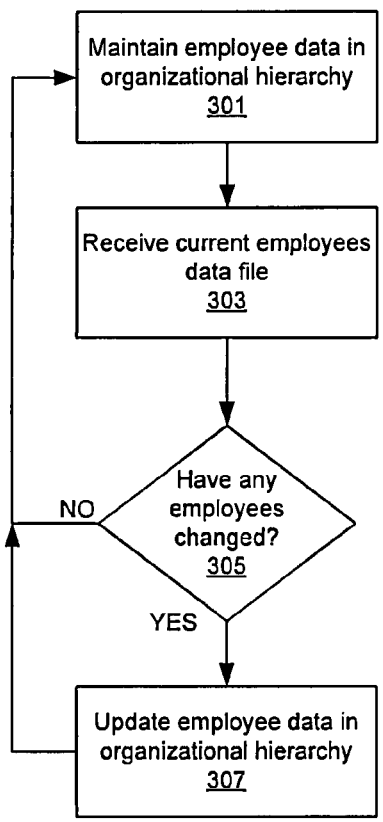
FIG. 3A is an example flow chart of an illustrative method for periodically updating access rights of employees of an entity in accordance with at least one aspect of the present invention.

As understood by those skilled in the art, the steps that follow in the Figures may be implemented by one or more of the components in FIGS. 1 and 2 and/or other components, including other computing devices. FIG. 3A is an example flow chart of an illustrative method for periodically updating access rights of employees of an entity in accordance with at least one aspect of the present invention. In step 301, employee data is maintained with respect to an organizational hierarchy. In one illustrative example, a database may maintain an organizational hierarchy chart that includes a listing of positions and an employee that fills that position with respect to an entity. Such data may be based upon a name, social security number, or some other form of appropriate identification.

Proceeding to step 303, the system may receive a new current employees data file that includes information with respect to one or more employees of the entity. The current employees data file may include data with respect to all employees of the entity or it may include data with respect to a single employee, divisional groups of employees, or various employees within various divisions of the entity. In addition, in accordance with at least one embodiment, the new current employees data file may include a table in an organizational hierarchy form.

In step 305, a determination is made as to whether any employee data has changed from the maintained employee data in step 301. If the data has not changed, the process may return to step 301 where the same current data is maintained. If employee data has changed in step 305, the process moves to step 307 where employee data is updated in the organizational hierarchy to reflect the change in employee data. Such may be the case to reflect the addition or deletion of a new employee or employees, a new group or team, a new division or sub-division to the system, in addition to changes of positions of one or more employees, groups, and teams from one position to another.

Figure 3B:
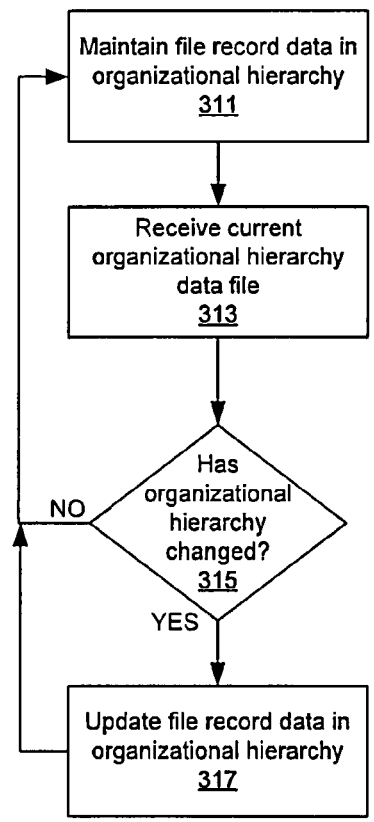
FIG. 3B is an example flow chart of an illustrative method for periodically updating access rights to records of an entity in accordance with at least one aspect of the present invention.

FIG. 3B is an example flow chart of an illustrative method for periodically updating access rights to records of an entity in accordance with at least one aspect of the present invention. In step 311, file record data is maintained with respect to an organizational hierarchy. In accordance with one embodiment, the organizational hierarchy that includes the file record data may be the same organizational hierarchy that includes employee data. In one illustrative example, a database may maintain an organizational hierarchy chart that includes a listing of file records that different divisions of an entity own, maintain, and/or have access to. Such data may be based upon a name of a record, number associated with the record, or some other form of appropriate identification.

Proceeding to step 313, the system may receive new current associations for the plurality of file records within the organizational hierarchy for the file record data. The current associations may include data with respect to all record files of the entity or it may include data with respect to a single record file, divisional groups of record files, or various record files within various divisions of the entity. In addition, in accordance with at least one embodiment, the new current associations may include a table in an organizational hierarchy form.

In step 315, a determination is made as to whether the organizational hierarchy of the entity has changed. If the organizational hierarchy has not changed, the process may return to step 311 where the same, current file record data is maintained. If the organizational hierarchy has changed in step 315, the process moves to step 317 where file record data is updated in the organizational hierarchy to reflect the change in the organizational hierarchy. Such may be the case to reflect the addition or deletion of a division or divisions, or a new subdivision or subdivisions, in addition to changes of divisions or subdivisions of a division to another division or subdivision.

Figure 4A:
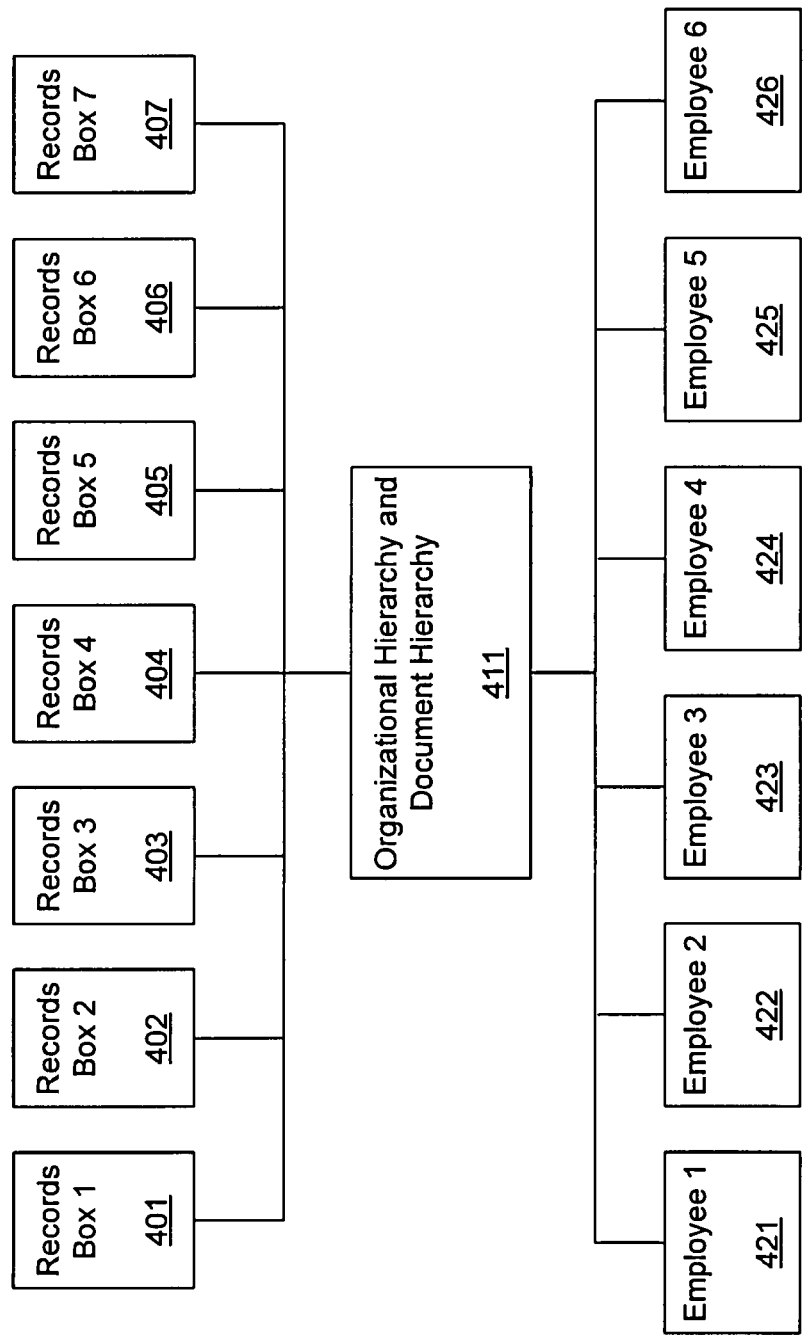
FIG. 4A is an example schematic diagram for a system for managing employees' access rights to records in accordance with at least one aspect of the present invention.

FIG. 4A is an example schematic diagram for a system for managing employees' access rights to records in accordance with at least one aspect of the present invention. As shown, a plurality of records boxes are shown operatively connected to an organizational hierarchy and document hierarchy 411. In the example shown, records box 1 401 to records box 7 407 are shown connected to organizational hierarchy and document hierarchy 411. As should be understood, the connection may be an identifier of the respective records boxes within the organizational hierarchy and document hierarchy 411. In addition, a plurality of employees is shown operatively connected to the organizational hierarchy and document hierarchy 411. In the example shown, employee 1 421 to employee 6 426 are shown connected to organizational hierarchy and document hierarchy 411. As should be understood, the connection may be an identifier of the respective employees within the organizational hierarchy and document hierarchy 411.

Figure 4B:
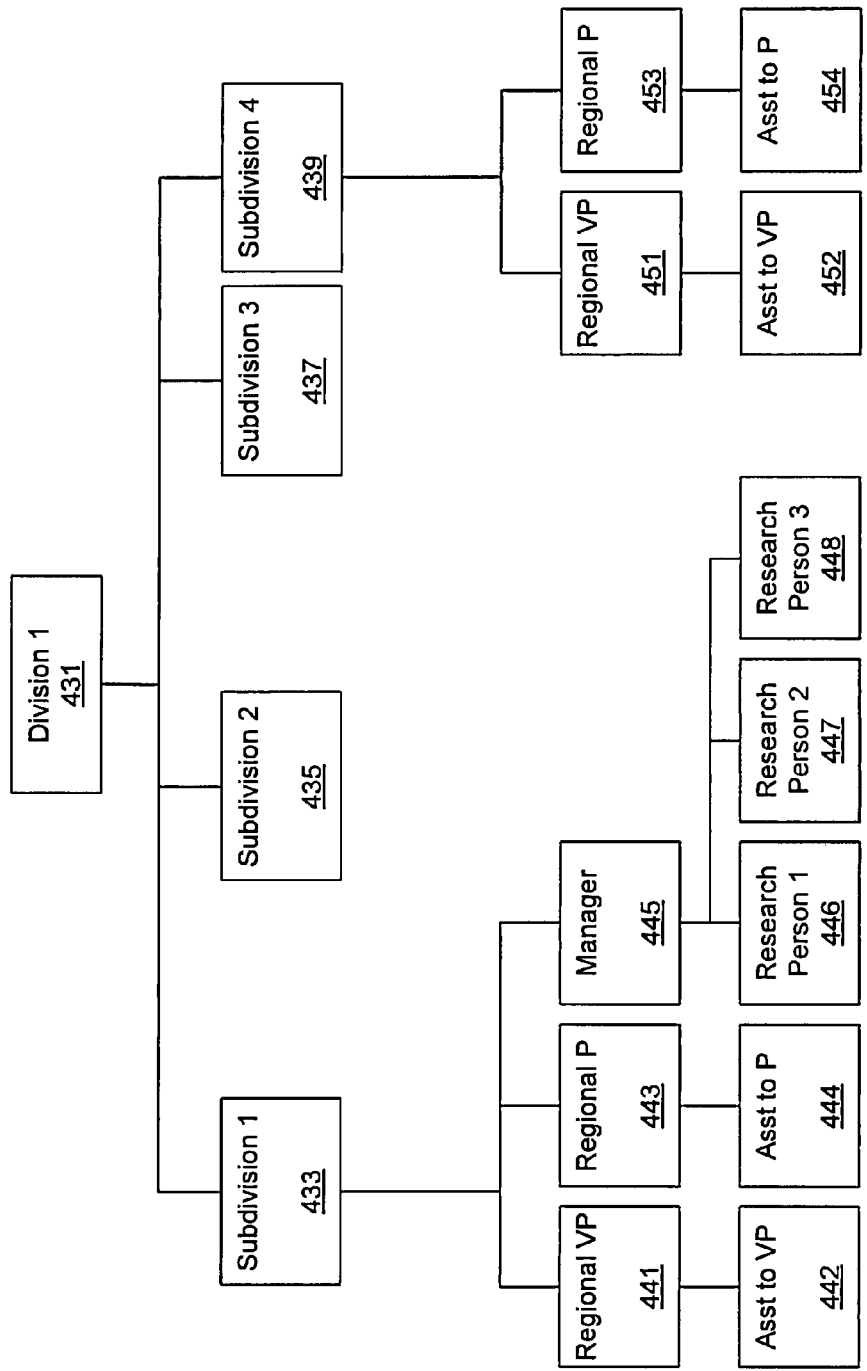
FIG. 4B is an example organizational hierarchy for a system for managing employees' access rights to records in accordance with at least one aspect of the present invention.

FIG. 4B is an example organizational hierarchy for a system for managing employees' access rights to records in accordance with at least one aspect of the present invention. FIG. 4B illustrates a typical organizational hierarchy that may include various positions within an entity and employees that fill the respective positions. FIG. 4B shows various divisions that may be included within the organizational hierarchy. A top division 1 431 is shown in the example. Division 1 431 is shown to include four subdivisions 1 433 to 4 439. In this example, under subdivision 1 433, there are three positions at the next level, a regional vice president 441, a regional president 443, and a manager 445. Under the regional vice president 441 is an assistant 442. Under the regional president 443 is an assistant 444, and under the manager 445 are research person 1 446, research person 2 447, and research person 3 448. Under subdivision 4 439, there are two positions at the next level, a regional vice president 451 and a regional president 453. Under the regional vice president 451 is an assistant 452, and under the regional president 453 is an assistant 454. Within this organizational hierarchy, any number of formats may be utilized and employee specific data may be included as needed. For example, with respect to regional president 443, a name of the employee that fills that position may be included. In the alternative, a social security number or other form of appropriate identification may be included. As should be understood by those skilled in the art, the example shown in FIG. 4B is but one example of an organizational hierarchy that may be utilized with respect to one or more aspects of the present invention. In addition, the format and form of the organizational chart may be in a format compatible with an electronic system.

Figure 4C:
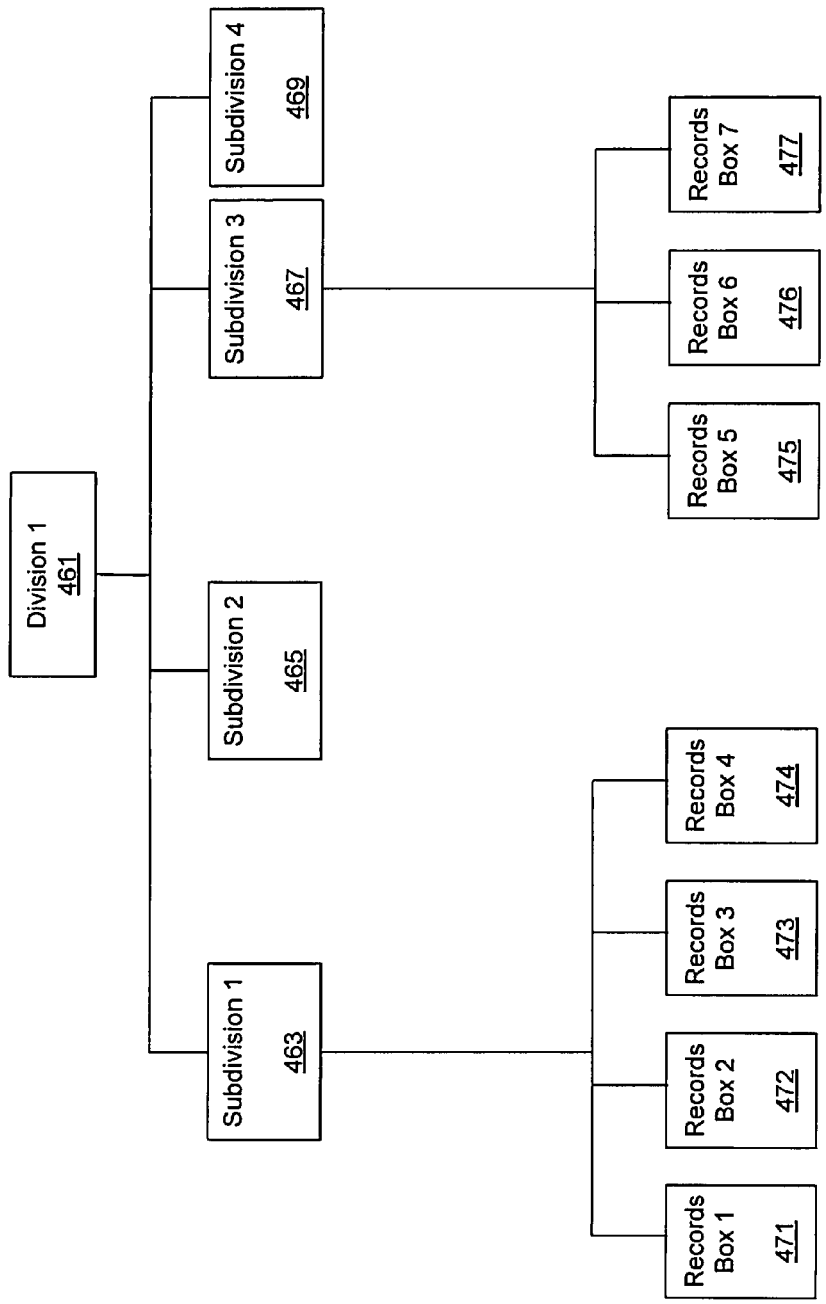
FIG. 4C is an example document record hierarchy for a system for managing employees' access rights to records in accordance with at least one aspect of the present invention.

FIG. 4C is an example document record hierarchy for a system for managing employees' access rights to records in accordance with at least one aspect of the present invention. FIG. 4C illustrates a typical document record hierarchy that may include various document records within an entity and divisions and subdivisions permitted access to the respective document records. FIG. 4C shows various divisions that may be included within the document record hierarchy. A top division 1 461 is shown in the example. Division 1 461 is shown to include four subdivisions 1 463 to 4 469. In this example, under subdivision 1 463, there are four document records at the next level, records box 1 471 to records box 4 474. Under subdivision 4 469, there are three document records at the next level, records box 5 475 to records box 7 477. Within this document record hierarchy, any number of formats may be utilized and document records specific data may be included as needed. For example, with respect to records box 1 471, a name of the document record may be included. In the alternative, a barcode or other form of appropriate identification may be included. As should be understood by those skilled in the art, the example shown in FIG. 4C is but one example of a document record hierarchy that may be utilized with respect to one or more aspects of the present invention. In addition, the format and form of the document record chart may be in a format compatible with an electronic system.

Figure 5:
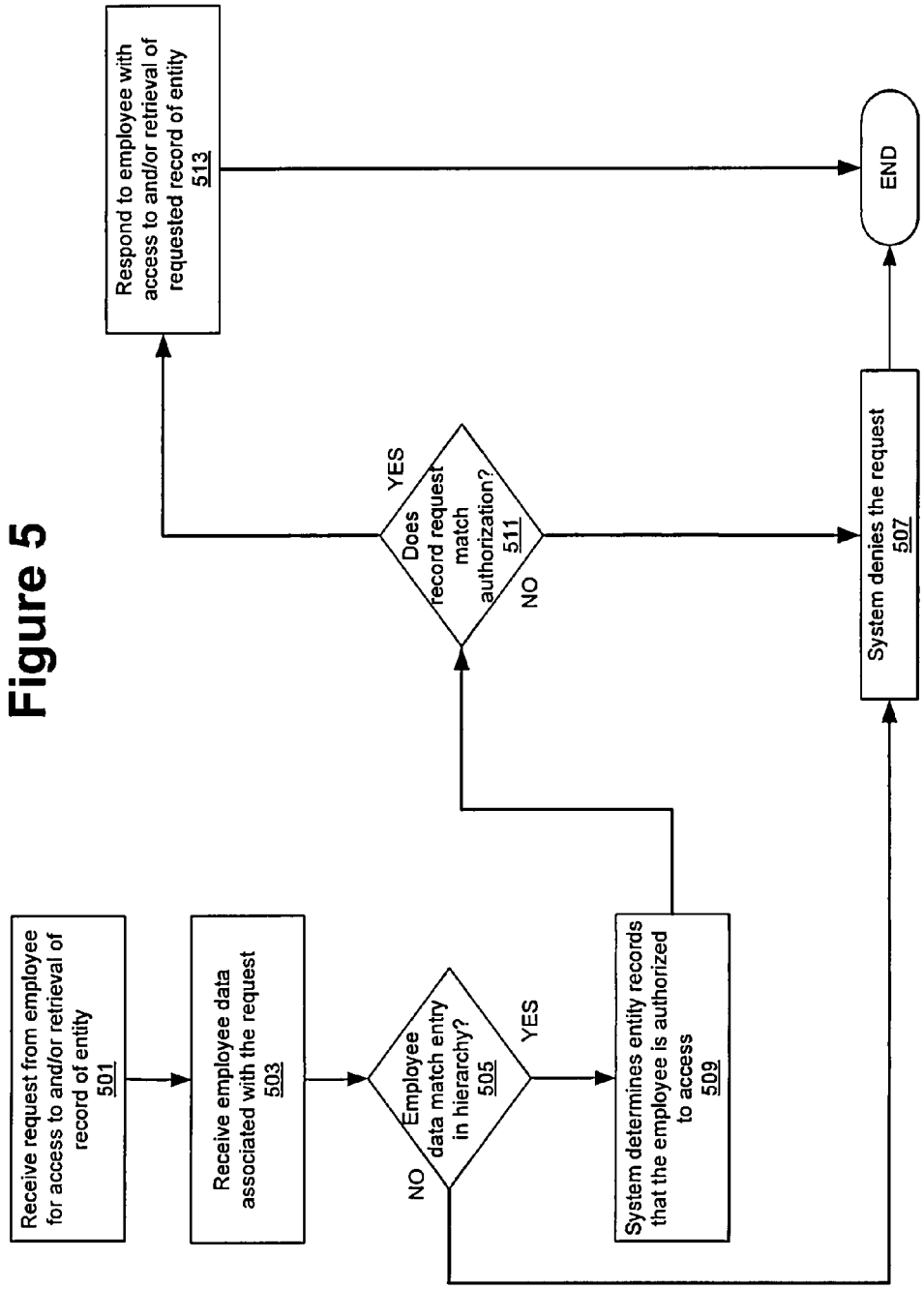
FIG. 5 is an example flow chart of an illustrative method for managing access rights to records of an entity in accordance with at least one aspect of the present invention.

FIG. 5 is an example flow chart of an illustrative method for managing access rights to records of an entity in accordance with at least one aspect of the present invention. The process starts and at step 501, the system receives a request from an employee of an entity for access to a specific record of the entity. As used herein, access includes retrieval of the specific record. At step 503, the system receives employee data associated with the employee making the request for the specific record. In one example, such employee data may include a name of the employee, a social security number, an entity specific code or password, and/or some other form of identification. In an alternative embodiment, step 503 may occur prior to step 501 and may be part of an initial log on to a website in which an employee provides a user name and password to the system. Such information then may be the employee data of step 503.

Proceeding to step 505, a determination is made as to whether the employee data matches an entry in an organizational hierarchy of the entity. Again, in an alternative embodiment, step 505 may occur following step 503 prior to a request made in step 501. In the example in FIG. 5, if the employee data does not match an entry in step 505, the process moves to step 507 where the system may deny access to the requested specific record by the employee before the process ends. If the employee data does match an entry in step 505, the process proceeds to step 509 where the system determines entity records that the employee is authorized to access. In one example, the system may identify a division, subdivision, or some other level within an organizational hierarchy to determine what document records the employee is authorized to access. If the employee is under that division, subdivision, or other level, those associated document records may be accessed by the employee.

From step 509, the process moves to step 511 where a determination is made as to whether the requested specific record matches an entry in a document record hierarchy indicating an authorized match. If the requested specific record does not match an entry in the document record hierarchy, the process moves to step 507 where the system may deny access to the requested specific record by the employee before the process ends. If the requested specific record does match an entry in step 511, the process proceeds to step 513 where the system responds to the employee with access to the requested record of the entity before the process ends. The response may include a visual and/or audio indication that the requested specific record may be accessed and/or may include an indication that the requested specific record is being sent to the employee.

FIG. 6 is another example flow chart of an illustrative method for managing access rights to records of an entity in accordance with at least one aspect of the present invention. The process starts at step 601 where an employee works within a first division of an entity. In one example, the employee may work within the financial department of the entity. At step 603, the employee may log on to an electronic system and request access to a first record associated with the first division. Proceeding to step 605, the electronic system responds to the employee with access to the requested first record of the entity. The response may include a visual and/or audio indication that the requested first record may be accessed and/or may include an indication that the requested first record is being sent to the employee.

Moving to step 607, the employee may request access to a first record associated with a second division of the entity. Proceeding to step 609, the electronic system responds to the employee with a denial of access to the requested first record of the entity associated with the second division. The response may include a visual and/or audio indication that the requested first record may not be accessed and/or may include an indication that the requested first record is not being sent to the employee.

At step 611, a determination is made as to whether the employee has changed positions within the entity now to be part of the second division or falls under the jurisdiction of the second division. If the employee has not changed positions, the process may end or return to step 601. If the employee has changed positions in step 611, the process moves to step 613 where the employee now works within the second division of the entity. In one example, the employee now may work within the marketing department of the entity instead of the financial department. At step 615, the employee may log on to the electronic system and request access to the first record associated with the first division. Proceeding to step 617, the electronic system responds to the employee with a denial of access to the requested first record of the entity. The response may include a visual and/or audio indication that the requested first record may not be accessed and/or may include an indication that the requested first record is not being sent to the employee.

Moving to step 619, the employee may request access to the first record associated with the second division of the entity. Proceeding to step 621, the electronic system responds to the employee with access to the requested first record of the entity associated with the second division. The response may include a visual and/or audio indication that the requested first record may be accessed and/or may include an indication that the requested first record is being sent to the employee.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method comprising:
maintaining employee data with respect to a first organizational hierarchy in at least one memory, the employee data representative of a plurality of employees of an entity;
maintaining file records data with respect to a second organizational hierarchy in the at least one memory, the file records data representative of a plurality of file records in storage at a records supplier associated with an organizational division of the entity;
receiving, at a first computer, a request from an employee of the plurality of employees for a file record of the plurality of file records;
determining, by the first computer, whether the requesting employee matches an entry in the first organizational hierarchy;
determining, by the first computer that the first organizational hierarchy has not changed, responsive thereto:
determining, by the first computer, whether the requesting employee is authorized to access said file record based on the second organizational hierarchy; and
permitting, by the first computer, access to the requested file record to the requesting employee upon determining that the requesting employee is authorized to access said file record based on the second organizational hierarchy;
wherein the step of permitting includes enabling an audio indication of status of the access to the requested file record;
wherein the second organizational hierarchy identifies specific physical documents records boxes accessible to employees of the organizational division of the entity and not accessible to employees of a different organizational division of the entity,
wherein the permitting, by the first computer, access to the requested file record to the requesting employee includes permitting access to a specific physical document records box identified in the second organizational hierarchy.

2. The method of claim 1, further comprising periodically receiving, at the first computer, data representative of current positions for the plurality of employees within the first organizational hierarchy.

3. The method of claim 2, further comprising updating, by the first computer, the employee data with respect to the first organizational hierarchy based upon the received data representative of the current positions.

4. The method of claim 1, further comprising periodically receiving, at the first computer, data representative of current associations for the plurality of file records within the second organizational hierarchy.

5. The method of claim 4, further comprising updating, by the first computer, the file records data with respect to the second organizational hierarchy based upon the received data representative of the current associations.

6. The method of claim 1, further comprising receiving data representative of the requesting employee at the first computer.

7. The method of claim 1, further comprising determining, by the first computer, file records of the plurality of file records that the requesting employee is authorized to access.

8. The method of claim 1, further comprising denying access, by the first computer, to the requested file record to the requesting employee upon determining the requested file record does not match a file record that the requesting employee is authorized to access.

9. One or more non-transitory computer readable media storing computer executable instructions that, when executed by at least one processor, cause the at least one processor to perform a method comprising:
   maintaining employee data with respect to a first organizational hierarchy, the employee data representative of a plurality of employees of an entity;
   maintaining file records data with respect to a second organizational hierarchy, the file records data representative of a plurality of file records in storage at a records supplier associated with an organizational division of the entity;
   receiving a request from an employee of the plurality of employees for a file record of the plurality of file records;
   determining whether the requesting employee matches an entry in the first organizational hierarchy;
   determining, by the first computer that the first organizational hierarchy has not changed, responsive thereto
   determining whether the requesting employee is authorized to access said requested file record based on the second organizational hierarchy; and
   permitting access to the requested file record to the requesting employee upon determining that the requesting employee is authorized to access said file record based on the second organizational hierarchy; wherein the step of permitting includes enabling an audio indication of status of the access to the requested file record;
   wherein the second organizational hierarchy identifies specific physical documents records boxes accessible to employees of the organizational division of the entity and not accessible to employees of a different organizational division of the entity,
   wherein the permitting, by the first computer, access to the requested file record to the requesting employee includes permitting access to a specific physical document records box identified in the second organizational hierarchy.

10. The non-transitory one or more computer readable media of claim 9, the method further comprising periodically receiving data representative of current positions for the plurality of employees within the first organizational hierarchy.

11. The non-transitory one or more computer readable media of claim 10, the method further comprising updating the employee data with respect to the first organizational hierarchy based upon the received data representative of the current positions.

12. The non-transitory one or more computer readable media of claim 9, the method further comprising periodically receiving data representative of current associations for the plurality of file records within the second organizational hierarchy.

13. The non-transitory one or more computer readable media of claim 12, the method further comprising updating the file records data with respect to the second organizational hierarchy based upon the received data representative of the current associations.

14. The non-transitory one or more computer readable media of claim 9, the method further comprising receiving data representative of the requesting employee.

15. The non-transitory one or more computer readable media of claim 9, the method further comprising determining file records of the plurality of file records that the requesting employee is authorized to access.

16. The non-transitory one or more computer readable media of claim 9, the method further comprising dewing access to the requested file record to the requesting employee upon determining the requested file record does not match a file record that the requesting employee is authorized to access.

17. A system comprising:
   at least one database configured to maintain employee data with respect to a first organizational hierarchy, the employee data representative of a plurality of employees of an entity, and file records data with respect to a second organizational hierarchy, the file records data representative of a plurality of file records in storage at a records supplier associated with an organizational division of the entity; and
   at least one computing device, operatively connected to the at least one database, operative to:
   receive a request from an employee of the plurality of employees for a file record of the plurality of file records;
   determine whether the requesting employee matches an entry in the first organizational hierarchy;
   determine that the first organizational hierarchy has not changed, responsive thereto:
   determine whether the requesting employee is authorized to access said file record based on the second organizational hierarchy the requested file record of file records that; and
   permit access to the requested file record to the requesting employee upon determining that the requesting employee is authorized to access said file record based on the second organizational hierarchy; wherein the permit step includes enabling an audio indication of status of the access to the requested file record;
   wherein the second organizational hierarchy identifies specific physical documents records boxes accessible to employees of the organizational division of the entity and not accessible to employees of a different organizational division of the entity,
   wherein the permitting, by the first computer, access to the requested file record to the requesting employee includes permitting access to a specific physical document records box identified in the second organizational hierarchy.

18. The system of claim 17, wherein the at least one computing device further operative to:
   periodically receive data representative of current positions for the plurality of employees within the first organizational hierarchy; and
   update the employee data with respect to the first organizational hierarchy based upon the received data representative of the current positions.

19. The system of claim 17, wherein the at least one computing device further operative to:
   periodically receive data representative of current associations for the plurality of file records within the second organizational hierarchy; and update the file records data with respect to the second organizational hierarchy based upon the received data representative of the current associations.

20. The system of claim 17, wherein the at least one computing device further operative to determine file records of the plurality of file records that the requesting employee is authorized to access.

21. The system of claim 20, wherein the at least one computing device further operative to deny access to the requested file record to the requesting employee upon determining the requested file record does not match a file record that the requesting employee is authorized to access.

22. The method of claim 1, wherein the plurality of file records in storage at the records supplier belonging to the organizational division of the entity are a plurality of physical file records.

\* \* \* \* \*